Dec. 10, 1946.  R. P. ASHBAUGH ET AL  2,412,196
METHOD OF AND APPARATUS FOR PRODUCING STRANDED CABLES
Filed Oct. 24, 1942  4 Sheets-Sheet 1

INVENTORS  R. P. ASHBAUGH
BY  A. G. HALL

ATTORNEY

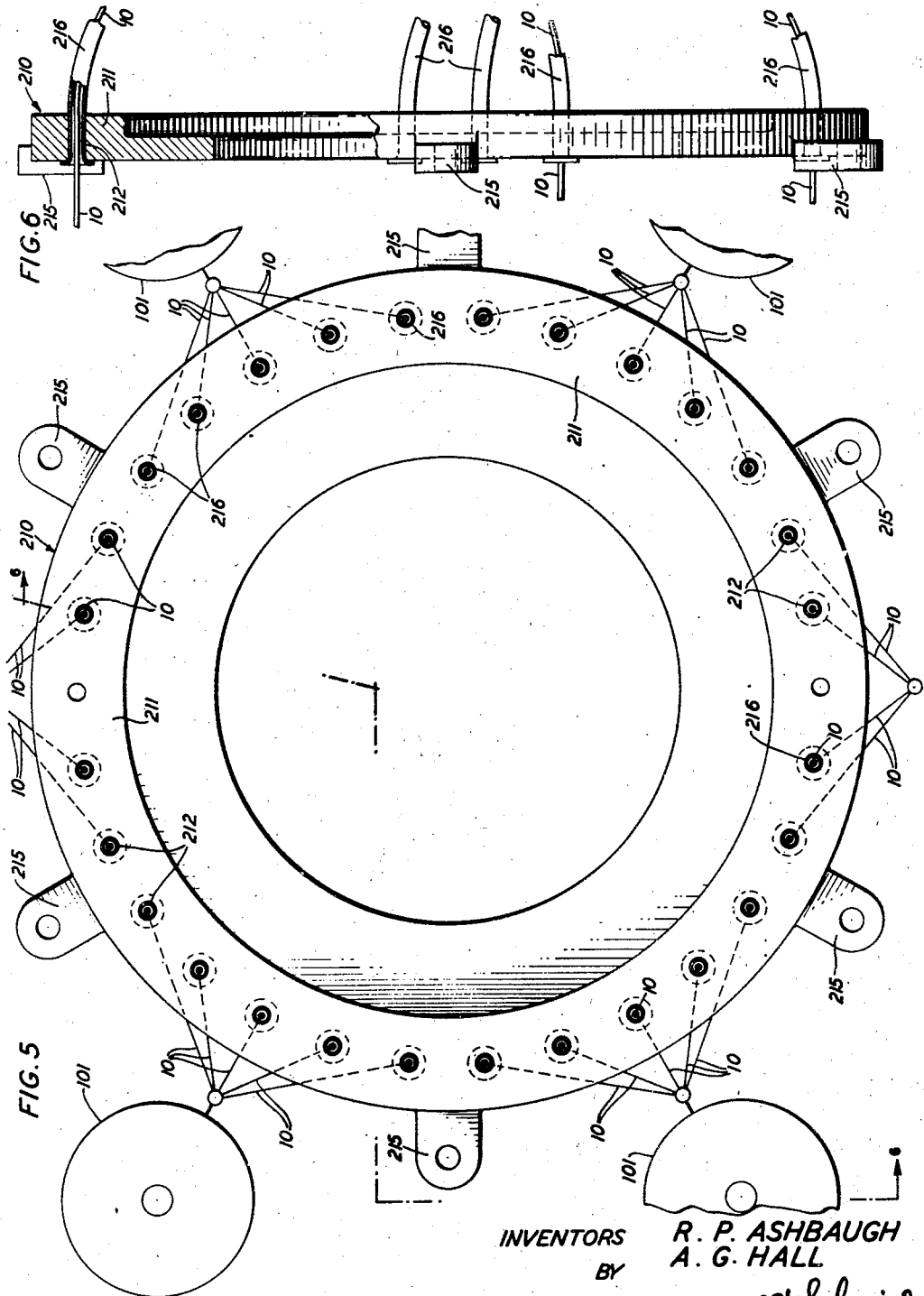

Dec. 10, 1946. R. P. ASHBAUGH ET AL 2,412,196
METHOD OF AND APPARATUS FOR PRODUCING STRANDED CABLES
Filed Oct. 24, 1942 4 Sheets-Sheet 3
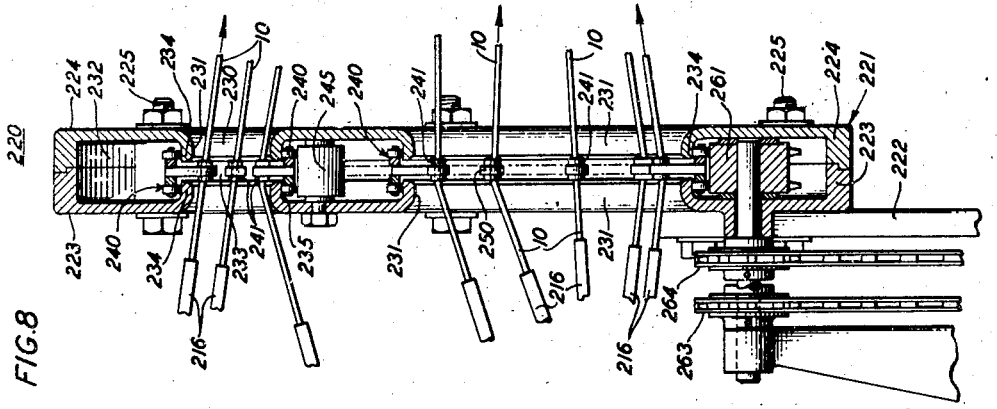
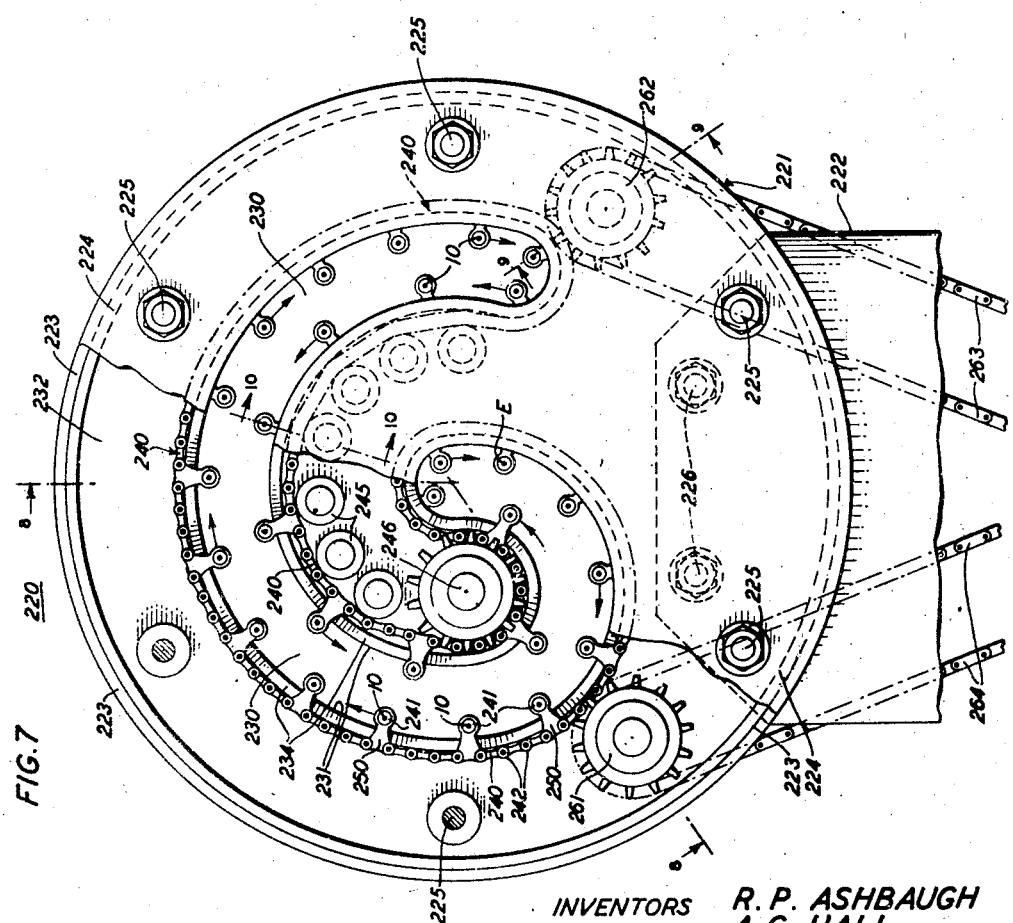
INVENTORS R. P. ASHBAUGH
A. G. HALL
BY
ATTORNEY Dec. 10, 1946.       R. P. ASHBAUGH ET AL       2,412,196
METHOD OF AND APPARATUS FOR PRODUCING STRANDED CABLES
Filed Oct. 24, 1942       4 Sheets-Sheet 4
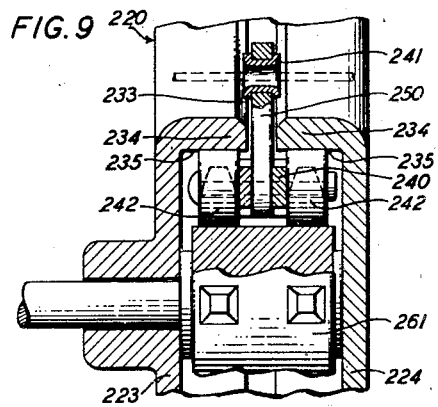
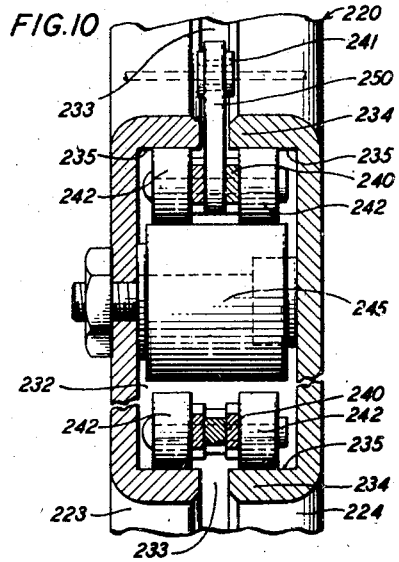
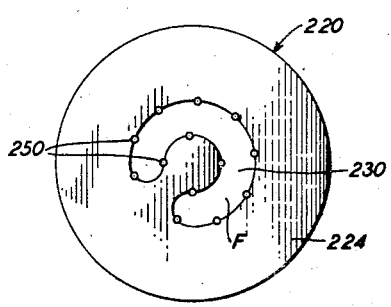
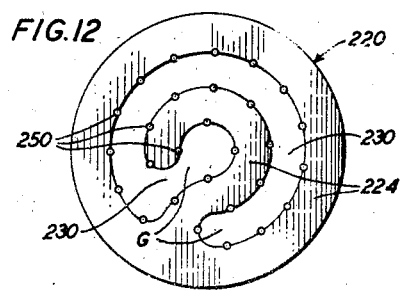
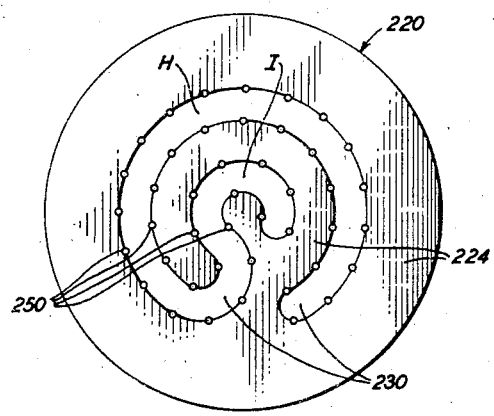
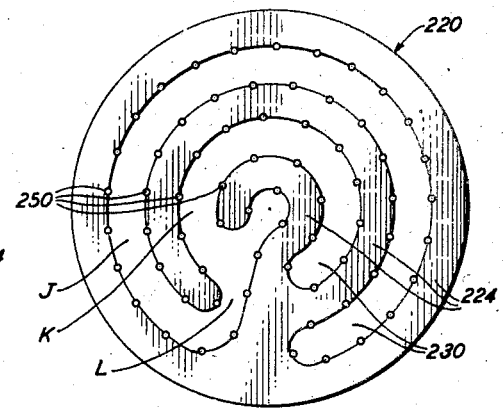
INVENTORS R. P. ASHBAUGH
A. G. HALL
BY
ATTORNEY Patented Dec. 10, 1946

2,412,196

UNITED STATES PATENT OFFICE 2,412,196

METHOD OF AND APPARATUS FOR PRODUCING STRANDED CABLES

Robert P. Ashbaugh and Arthur G. Hall, Westfield, N. J., assignors to Bell Telephone Laboratories, Incorporated, New York, N. Y., a corporation of New York Application October 24, 1942, Serial No. 463,188

22 Claims. (Cl. 57—59)

This invention relates to methods of and apparatus for producing stranded cables.

The invention relates more particularly to the production of stranded cables of the reentrant type. The reentrant type of stranded cables is characteristic in that each of its strands occupies positions at periodically varying depths in successive portions of the cable.

It is an object of the invention to provide a communication cable containing a plurality of strands of insulated conductors, the stranding being such that a reentrant cable is formed.

It is a further object of the invention to provide a practical method of producing a reentrant cable.

It is a further object of the invention to provide a stranding machine adapted for the practical and efficient production of a reentrant cable.

It has before been proposed to produce power cables of the reentrant type with the object of reducing the skin effect at the usual commercial frequencies. In such cables the individual strands are thinly coated with insulation and all the strands are interconnected at the ends and perhaps at a few intermediate points of the cable in order that they may all contribute to the common conductivity of the cable.

The cables produced in accordance with the invention are not power cables constituting a single conductor built up of a plurality of strands, though the method of producing the cables and the machinery therefor, provided in accordance with the invention, are adapted not only for the production of the communication cables contemplated by the invention, but also for the production of power cables or of any other type of multistrand cable.

One well-known type of communication cable is built with one or a few strands laid up in the center and one or more surrounding layers. Each strand is composed of a pair or a quad of individually insulated conductors twisted together with a predetermined pair or quad twist which is different for adjacent strands to reduce interference between them. The stranding is usually arranged so that the lay in one layer is opposite to that in the adjacent layers or of different length or both, also for the purpose of reducing mutual interference.

Another type of communication cable, known as the unit type cable, comprises a comparatively few units of strands, each containing a comparatively large plurality of strands which are bunched together with a less definite layer formation, but with certain of the strands always being located in the surface of the unit.

The body of strands is usually given one or more wrappings of paper tape and is then enclosed in a hermetic lead sheath or other suitable metal sheath. The sheath may be in the nature of a shield against external interference or an envelope against moisture and physical damage or may combine these two functions.

In both of the types of communication cables just referred to, each strand of pairs or quads occupies a substantially fixed position along the entire manufacturing length relative to a given hypothetical surface line parallel to the axis of the cable, which line will be referred to hereinafter as the surface reference line. Thus, there will be a group of strands which will be located in the layer adjacent to the metal sheath over the whole or a large proportion of the manufacturing length. The remaining strands will always be located at greater depth from the sheath.

It has been found that by virtue of this fixed relation to the sheath of any one strand along the length of the cable, the electrical characteristics of the circuit in the strand are appreciably effected by the proximity of the shield or sheath and that this effect varies from strand to strand in accordance with the depth in the cable at which the strand is located. The unequal effect of the sheathing upon the outer layers has been found to vary greatly with the conductor size; it may be almost negligible with conductors of No. 22 gauge or smaller and increases for larger size conductors.

Since the angle of lay of the strands usually increases toward the outer layer, the length of the strands in a unit length of cable increases toward the outer layer. This difference in length obviously affects the electrical characteristics differently at the various depths in the cable.

Another cause of variation in the electrical characteristics in the circuits has been found in the difference in pressure exerted on the layers at different depths by the surrounding layers, this pressure being greatest near the center.

As is well known, it is necessary for the practical operation of a commercial communication system that all the similar circuits in a cable should have the same characteristics within practical limitation. For this purpose it is a well-known practice to cross-connect the circuits between adjacent lengths of cable in such a manner that the inequalities in their characteristics, referred to above, are equalized to within prescribed practical limits.

It has, however, been found that in cables which are used for carrier frequency communication a higher degree of uniformity in electrical characteristics is required than in cables for voice frequencies. Since it would not be economically practicable to sufficiently equalize the characteristics by cross-connection between adjacent cable lengths to satisfy these more stringent requirements, it becomes a practical requirement of cables which include carrier circuits, that these circuits should have their characteristics equalized within each cable length to a much greater degree than in voice frequency cables.

It is, therefore, an object of the invention to provide a communication cable in which the varying characteristics of at least a group of circuits in a cable length are periodically and effectively equalized for all the circuits of the group, to permit the usual cross-connection thereof to a similar group in an adjoining cable length.

In accordance with a feature of the invention the equalization of circuit characteristics in a communication cable is secured by a disposition of the strands within the metal sheath in accordance with which each strand in a predetermined length of cable occupies successive positions at all possible depths from the surface to the center and all the strands occupy any one depth over equal fractions of the predetermined length of the cable.

In accordance with a further feature of the invention a multistrand cable of any kind is made reentrant in the manner just described, by first distributing all the strands from a strand supply in a substantially circular formation for simultaneous feeding toward the cable, then redistributing all the strands in spaced relation in a layer formation conforming to the layer formation desired in the finished cable, and then compacting all the strands into the desired cable size and, simultaneously, with the longitudinal movement of the strands, imparting a transverse movement to the strands at the point of the layer distribution to cause each strand to travel transversely and cyclically through all the layers in succession to successively occupy the various positions simultaneously occupied by all other strands at any given time at the said layer distribution point.

In accordance with another feature of the invention a stranding machine is provided having a strand supply of a plurality of spools each holding a supply of strand which may be a pair or a quad of insulated conductors or which may be a single bare wire or any plurality of bare or insulated wires. The strands from the spools are passed through a succession of distributing plates, the first of which is a circular distributing plate and a subsequent one is a layer distributing plate; the plates have guiding means for each strand and the layer distributing plate has a track for guiding the transverse travel of the guiding means with the strands along a path of paralleled stretches in configuration corresponding to the desired layer configuration of the stranded cable. For this purpose flexible conveyor means are provided for supplying power for the transverse movement of the strand guides relative to the distributor plate at a uniform speed definitely related to the speed of lengthwise travel of the strands through the machine, so that each strand will pass through a cycle covering the entire stranding pattern simultaneously with the lengthwise travel through a given unit length of cable. The distributed strands thereafter pass into the usual compacting device or polisher for forming the cable.

The stranded cable may thereafter pass through an arrangement for wrapping a paper tape or a binder about the cable, and the machine may further include power-driven means for pulling the cable uniformly through the machine and for storing the cable. The machine may, of course, include means for applying other elements to the stranded cable, such as metal strips or braids for shielding purposes and it may include means for applying an over-all lay to the layered cable. Upon removal of the cable from the machine the cable may pass through other machines for applying a metal shield, such as a lead press for applying the lead sheath, and other machinery for applying outer armoring or wrappings.

In passing from the circular distributing plate in the stranding machine to the layer distributing plate the strands will take different angular mutual relations as they travel transversely through the distributor pattern and at certain points the strands may be deflected by engagement with other crossing strands. It is, therefore, a further feature of the invention to provide protective shielding or separating means between adjacent strands at the points between the distributing plates where they would otherwise engage, in order to reduce friction between them and prevent deterioration of the insulation.

The invention will now be described more in detail as applied to specific embodiments. It should, however, be understood that the principles of the invention are not limited to the described embodiments but may be applied to other arrangements, as will be understood by those skilled in the art.

In the following detailed description reference will be made to the attached drawings, in which:

Fig. 5 is a plan view of a circular distributing plate used in the machine shown in Fig. 4;

Fig. 6 is a cross-sectional view of the plate shown in Fig. 5, taken on the line 6—6 therein;

Fig. 7 is a detailed plan view of a layer distributing plate corresponding to that shown diagrammatically in Fig. 12; in this view certain parts are broken away to show the internal construction;

Fig. 8 is a cross-sectional view of the distributing plate shown in Fig. 7; the cross section is taken on the line 8—8 in Fig. 7;

Figure 4:
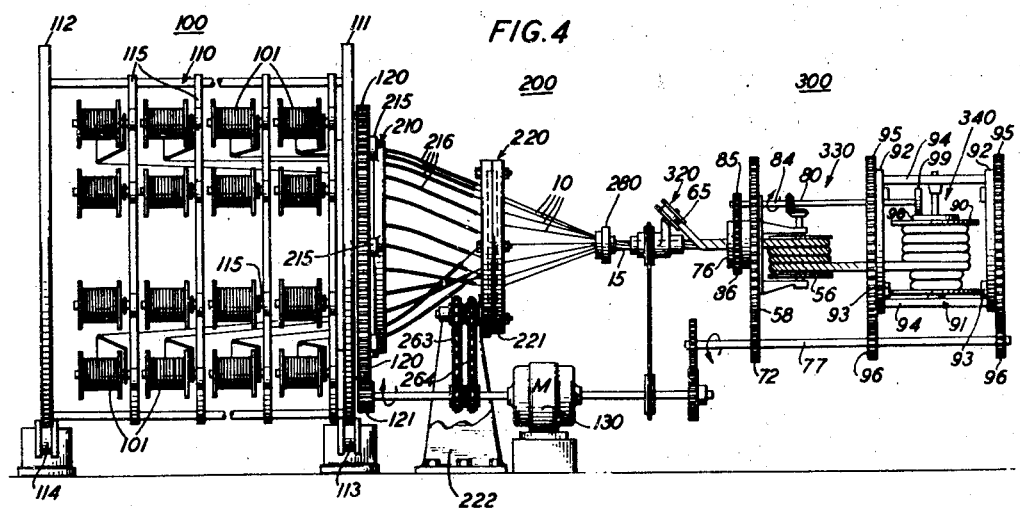
Fig. 4 is a simplified view of a stranding machine arranged for the purposes of the invention to produce a reentrant type cable.

Figs. 9 and 10 are cross-sectional views of the distributing plate shown in Fig 9 showing certain details of the plate; these cross sections are taken on lines 9—9 and 10—10 in Fig. 7; and Figs. 11, 12, 13 and 14 are diagrammatic representations of layer distributing plates for the stranding machine in Fig. 4 arranged for producing layer formations for the strands in cables of 2, 3, 4 or 5 layers, respectively.

Figure 1:
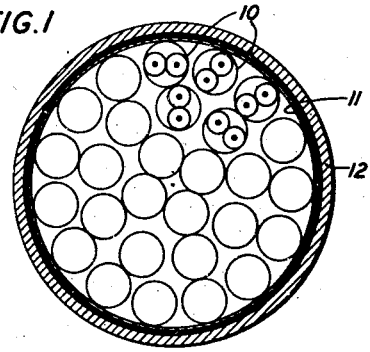
Fig. 1 is a schematic cross-sectional view of a communication cable to which this invention is applicable; each strand comprises a twisted pair of insulated conductors.
Figure 2:
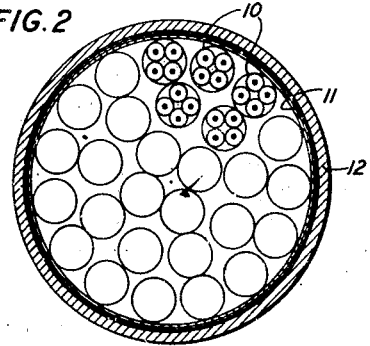
Fig. 2 is a similar view of a communication cable in which each strand comprises a twisted quad of insulated conductors.

The communication cable shown in Fig. 1 comprises twenty-eight strands 10 of twisted pairs arranged, as shown, with four strands in the center, nine strands in the first surrounding layer and fifteen strands in the outer layer. The cable strands are surrounded by a paper wrapping 11 which, in turn, is covered by a lead sheath 12. A similar cable is shown in Fig. 2 in which each strand however, is composed of four insulated conductors twisted to form what is known as a star-quad. Other types of strands and other types of twisting of the quads may be used within the scope of the invention. These cables are typical communication cables and may, of course, contain several more layers of strands. The conductors are usually insulated with paper and the pair or quad twist of any one strand usually differs from those of the adjacent strands in the same layer.

For the purposes of the invention, any one strand of the cable, as shown either in Fig. 1 or Fig. 2, is stranded into the cable in such a manner that it takes different positions within the cross section of the cable as the strand is followed lengthwise of the cable. Each strand passes through a series of positions which in a given length of cable includes all the positions of the other strands as they appear in any one particular cross section. Each strand may thus be said to pass through a cycle of position changes over the given length of cable, which will be referred to hereinafter as a unit length, and the cycle is repeated in successive unit lengths.

Figure 3:
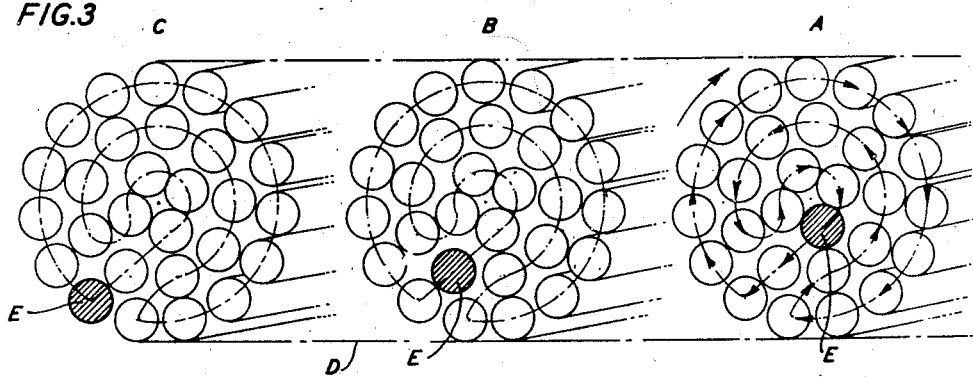
Fig. 3 is a schematic representation of a length of cable with any kind of strands arranged in accordance with the invention and showing successive stages of the stranding.

Fig. 3 is intended to give a fair visualization of this arrangement and shows a portion of cable D with three successive cross sections A, B and C illustrated schematically. The cable may be of any kind with the same number of layers and strands as the cables in Figs. 1 and 2. A strand E may be followed through a pattern cycle through a unit length, beginning in the cross section A and ending with the strand in the same position as in cross section A. In successive cross sections from right to left and short distances apart along the unit length, the shifting strand will take successive positions, as indicated by the dot and dash lines in cross section A, and may be assumed to move uniformly in the direction of the arrows. Thus, in cross section A the strand E is in the center, in cross section B it has moved from the center to the middle layer and in cross section C it has moved to the outer layer. In succeeding cross sections the strand will follow the pattern and arrows shown in the cross section A and thus will first pass through all positions in the outer layer, then through all positions in the next inside layer and then through all positions in the center, after which the cycle will be repeated.

From Fig. 3 it will be observed that as the strands are followed from right to left, the strands in the outer layer will have a clockwise shift, in the next layer the shift will be counterclockwise, and in the center layer it will again be clockwise. Thus, the strands in adjacent layers will cross at an angle, thereby reducing interference between the strands in adjacent layers. It will be further noted from Fig. 3, that the various strands are arranged in a fixed order of succession and retain this order in their transverse movements through a cycle of position changes.

The cable, as illustrated in Fig. 3, may be assumed to have passed through the stages in a stranding machine which are adapted for guiding the strands into the different positions in the different layers and to have passed through a compacting device or polisher which fixes the layer formation. It will be noted that the layer pattern, indicated by dot and dash lines, is shown in Fig. 3 to retain in the successive cross sections its angular relation with respect to an arbitrary surface reference line; this would be the case when no over-all lay is applied to the layered cable after it leaves the polisher. An over-all lay may, however, be applied by twisting the cable bodily at a uniform speed after the layered cable has passed through the polisher; the effect would be to rotate the layer pattern about the cable axis without disturbing the established interrelation between the strands, with the result that the layered cable would receive an over-all stranding lay which may be similar to the stranding lay of prior art communication cables.

The relation between the unit length of cable, in which each strand completes a cycle of position changes, and the length of lay, in which the cable is given a complete twist, depends on the requirements of the cable. Thus in a communication cable the cycle of layer formation may be stretched over 50 to 100 feet, whereas the length of lay may be of the order of a few feet, for example, from 1 to 10 feet.

Whereas with a combination of layer distribution and over-all stranding lay the strand E may not take all possible positions within a unit length of cable relative to a surface reference line, each strand will, however, take all possible positions relative to all the other strands and all strands will travel through similar paths in each unit length of cable.

Thus, in a communication cable stranded in accordance with the invention, all the strands will be similarly exposed to the proximity of the metal sheath or shield and to the varying layer pressures, and all strands will necessarily be of equal length in each unit length of cable since they pass through similar paths. Thus, the inequalities in electrical characteristics of the various strands due to these varying causes may be inherently reduced to within desirable limits, and the necessity for or degree of equalization by cross-connections between cable lengths may be reduced accordingly, whether the cable be for voice or carrier frequencies or both.

A stranding machine for producing cables of the type described in connection with Figs. 1, 2 and 3 is shown in Fig. 4.

This machine comprises a strand supply 100, strand distributing equipment 200 and a cable storing equipment 300.

The strand supply 100 may be arranged in any convenient manner, but in the present embodiment comprises a plurality of spools 101 mounted in a spool cradle 110. The cradle 110 has two circular end plates 111 and 112, which ride on pairs of rollers 113 and 114. A crown gear 120 is fastened to the end plate 111 and meshes with a pinion 121 driven by any convenient power supply 130, such as an electric motor. Thus, the entire cradle with all the spools may be rotated as a unit about the cable axis at a desired uniform speed.

The individual spools 101 contain a supply of strand for the cable and each is mounted for individual rotation and has a brake arrangement, as is well known in the art. The strand from the spool may be led through suitable eyelets arranged to equalize the speed of feeding of the strand, as is well known in the art. These details of the spool mountings are not shown in the drawing, since they do not form a part of the invention. For information on such details reference may be had to the United States Patents 1,579,769, issued to H. F. Jones on April 6, 1926, and 1,813,197, issued to L. O. Reichelt on July 7, 1931.

The cradle contains a spool for each strand and the spools may be arranged on a plurality of sets of spindles 115. For the present purpose the machine may have five sets of spindles each set containing five or six spools to supply the twenty-eight strands ten to a cable, such as shown in Figs. 1, 2 and 3.

The distributing equipment 200 comprises a circular distributing plate 210, a layer distributing plate 220 and a polisher 280.

The distributing plate 210 is fastened on the spool cradle 100 for rotation in unison therewith. The face view of the plate 210 shown in Fig. 5 includes a diagrammatic showing of the spools 101. As will appear from Figs. 5 and 6, the circular distributing plate 210 comprises a solid ring 211 with a series of guide holes 212 for the strands. The guide holes are arranged in a circle and with sufficient spacing between them to provide a degree of freedom of movement for the strands in the space between the plates 210 and 220. In the present case thirty guide holes or eyelets are provided of which only twenty-eight are used. The ring 210 may be fastened by means of the lugs 215 to the cradle 110.

The layer distributing plate 220 comprises a stationary plate or frame 221 mounted on a suitable stand 222 at a convenient distance from the plate 210, parallel and coaxial therewith. This distributing plate is shown more in detail in the face view in Fig. 7 and in the cross sectional views in Figs. 8, 9 and 10.

The plate 221, being arranged for reentrant distribution of the strands in a center and two layers, the general path of travel of the strands will be as shown in Figs. 3 and 12.

The plate 221 comprises a main or rear plate 223 and a front plate 224 of the same general configuration as plate 223 and firmly bolted thereto by means of the bolts 225 to form a rigid unit therewith. The rear plate 223 is fastened to the stand 222 by means of bolts 226.

The plates 223 and 224 are shaped to form a substantially spiral opening 230 through which the strands pass from the strand supply 100 to the storing equipment 300 and the plates present smooth surfaces 231 with rounded corners toward this opening.

The plates 223 and 224 are properly centered and in contact along their outer periphery and they are shaped to form a hollow interior 232 and have lips 234 along the inner surfaces 231, which are separated to leave a slot-like opening 233 between the hollow interior 232 and the opening 230 along the entire surface 231.

The surfaces 235 on the inside of the lips 234 are machined off to provide a track for an endless roller chain 240. The chain carries a plurality of eyelets 241 through which the strands 10 are threaded; in the present case twenty-eight eyelets are shown. If desired the same distributing plate may be used for cables with a smaller number of conductor strands in each layer, and for this purpose certain eyelets fairly evenly distributed along the chain may be left empty or a smaller number of eyelets may be redistributed substantially evenly on the chain.

The chain 240 is made up of a large number of links in any convenient manner and is provided with a roller 242 on each side of each link adapted to be in rolling engagement with the machined surfaces 235 of the lips 234. The chain is laid into the hollow interior 232 between the plates and in continuous engagement with the lips 234 along both sides of the spiral opening 230. The chain thus follows the outline of three substantially concentric circles corresponding to the center and the first and second layer of strands in the cable. Whereas the chain will hold itself in contact with the concave portions of the track in the innermost and outermost circles, the chain will have a tendency to fall away from the convex track in the intermediate circle. To hold the chain in engagement with this portion of the track, a plurality of rollers 245 are mounted in the interior of the distributing plate at suitable spacing to define a track for the chain fairly closely coinciding with the circular track formed by the lips. One roller 246 over which the chain passes from the innermost to the intermediate circle may have teeth meshing with the chain, and may be power driven if desired.

Each of the eyelets 241 is formed in a flat link member 250 of the chain, which projects perpendicularly from the chain and extends through the slot 233 between the lips 234 into the space 230. This link member 250 may be part of the chain, as shown in the drawing, or it may be in the nature of an attachment arranged in any convenient manner for insertion in the chain at convenient distances. The eyelets 241 have a smooth inner surface for passage of the strands therethrough.

It should be understoood that the conveyor means for moving the eyelets over the double track along opposite sides of the slot-like spiral opening 230 need not be a chain of links, but may be any other kind of flexible member closed upon itself. The eyelets may be fastened thereto in any manner that will suit the particular design.

The chain 240 is caused to travel over the track by means of suitable chain sprockets 261 and 262 pivoted on the inside of the rear plate 223, as shown more in detail in Fig. 9, and these sprockets are in turn driven by chain drives 263 and 264 from the shaft of the driving motor 130.

The distributing equipment 200 further comprises the usual polisher 280 for receiving the converging strands from the plate 220 and compacting them into a cable of a desired diameter and a desired density. The polisher or sizing die 280 is designed to assemble the converging strands 10 into a compact cable or strand unit 15 which may be of any desired cross section; in the present instance the cable is of a substantially circular cross section. With the proper number of strands in the successive layers for substantially filling the circular cross section of the cable with strands, the polisher will operate to fold the layers into complete circles, even though the layers may leave the distributing plate 220 with a considerable gap occasioned by the mechanical construction of the plate for effecting the spiral double track. As the strands leave this double track the desired layer pattern will subsequently be fully established by the folding and compacting action of the polisher.

From the polisher the layered cable passes into the cable storing equipment 300 which comprises a tape wrapping equipment 320, a power-driven capstan 330, and a frictionally-driven cable reel 340. The general arrangement of the cable storing equipment is similar to that disclosed in the United States Patent 1,920,182, issued to H. J. Boe on August 1, 1933. It should, however, be understood that the cable storing equipment may be of any convenient construction adapted for pulling the cable from the polisher at a uniform speed and also adapted for imparting a uniform over-all lay of a desired length to the cable.

The serving head 320 is rotatably supported and carries a supply reel 65 of paper ribbon or any other suitable wrapping or binding material. The serving head is driven by a chain drive from the motor 130 at a suitable speed, applying the ribbon helically to the advancing cable.

From the serving head 320 the cable 15 passes through an aperture in the capstan supporting plate 58 and on to the capstan drum 56 which is mounted so that the receiving portion of the drum is tangentially disposed with respect to the axis of rotation of the plate 58. The capstan plate 58 is rotatably journaled in a bearing 76 and is provided on its periphery with gear teeth designed to mesh with a pinion 72 on the auxiliary motor shaft 77, driven through suitable gearing from the motor 130. The capstan 56 is journaled in supports fastened on the plate 58 for rotation about its own axis and for rotation together with the plate 58 about the axis of the moving cable. The capstan 56 is driven about its own axis through the rotation of the plate 58 by bevel gears 80 through shaft 84 and a pinion 85 meshing with the stationary gear 86 fixed to the bearing 76. By this construction it will be understood that the shaft 84 is driven through the rotation of the capstan plate 58 and in turn drives the capstan 56 through the gears 80, 85 and 86 about its axis.

The cable 15 after making a number of turns around the capstan 56 is delivered to the take-up reel 90, removably mounted in a rotatable cradle 91. The cradle 91 comprises a pair of spaced annular rings 92, 92 supported on spaced rollers 93, 93 and rigidly interconnected by crosspieces 94. The annular rings 92 are provided with flanged peripheral portions 95, 95 having gear teeth which mesh with pinions 96, 96 on the secondary shaft 77 for driving by the motor 130. In this manner rotation of the cradle 91 and take-up reel 90 is maintained at the same speed as that of the capstan 56 and around the same axis. The take-up reel is mounted in the crosspieces 94 of the cradle for rotation about its own axis and may be driven from the capstan drive shaft 84 through friction wheels 98 and 99.

Each of the strands 10 after passing through a guide hole 212 in the distributing plate 210 passes through a flexible tube 216 which is long enough to cover the strand over nearly the whole distance between the two distributing plates 210 and 220. One end of each tube 216 is fastened to the plate 210, to be in alignment with the corresponding guide hole 212 and the free end of the tube is supported on the strand and partakes in the movement of the strand through the various angular positions imposed on the strand by the distributing plate 220. The tubes 216 may, however, be fastened in any other convenient manner; thus they may be attached to the distributing plate 220 rather than to plate 210 or they may be left floating on the strands between the two plates. The tubes 216, having a smooth inner surface, serve to eliminate friction between adjacent strands. These tubes may be of rubber or any other suitable flexible material, such as a synthetic plastic or a wire helix.

With the specific arrangement of the stranding machine, as shown in Figs. 4 to 10, the strands from the spool cage 110 are moved longitudinally with a uniform average speed through the circular distributing plate 210 and the layer distributing plate 220, through the polisher 280 and the tape serving head 320 and pass on to the capstan 330 as a stranded cable; the cable takes a number of turns about the capstan in order to provide sufficient friction and is passed to the cable reel 340 for storing.

Simultaneously with this longitudinal movement of the strands and the cable, there are rotary movements about the axis of the machine for the purpose of securing the desired layer formation of the strands and a desired over-all stranding lay in the cable. Thus, the spool cage 110 is rotated as a body together with the circular distributing plate 210 and the conveyor 240 in the layer distributing plate 220 at a desired uniform speed, each revolution representing a cycle of layer formation; and the capstan 330 and cable reel 340 are bodily revolved about the same axis to make a desired number of revolutions for producing the stranding lay.

It is necessary to arrange for rotation of the strands at the point of passing through the layer distributor 220 so that they will pass through a corresponding pattern cycle in the stationary frame 221 of the distributor 220 without being continuously twisted together. For this purpose, the conveyor or chain 240 in the distributor 220 is driven over the spiral double track in the distributor with a speed whereby any link in the chain and any strand in its eyelet 241 will complete its travel over the entire track in the time of one cycle or of one revolution of the spool cage 110.

Following the movement through one cycle of one of these strands as, for example, the strand E through the three-layer pattern of the track shown in Fig. 7, it will be assumed that the direction of rotation of the chain is as indicated by arrows in the figure, namely in opposite directions in adjacent layers. With a nearly uniform linear speed the strand E gradually leaves the central layer and passes through the intermediate layer into the outer layer, then occupies a comparatively long time in traveling through the fifteen strand positions in the outer layer; then it passes in about half that time through the eight successive strand positions in the intermediate layer and then in a short time through the four strand positions in the central layer to the point of starting. Thus, the strand is applied in the outer layer with a pitch about equal to half the unit length of cable, in the intermediate layer with a pitch about equal to one fourth of the unit length, and in the center with a pitch about equal to one seventh of the unit length. With a comparatively short unit length the stranding obtained in this manner may be sufficient for securing a cable with a desired flexibility, in which case it would not be necessary to twist the layered cable after it leaves the polisher. However, with unit lengths over about 3 or 4 feet, it will usually be necessary to impart a comparatively short over-all stranding lay, especially in the case of communication cables, in order to secure the required flexibility. This stranding lay will usually be of the order of 2 to 3 feet while the unit length will ordinarily be of the order of 50 to 100 feet. In this case the storing equipment will be driven to rotate the cable about its axis after the cable leaves the polisher. The layered cable may be rotated in either direction, but would preferably be rotated in the same direction as the direction of stranding in the outer layer secured by the layer distribution. The spool cage and the chain may, of course, be rotated in either direction relative to the layer distributing plate 220 for producing a cable with layers and stranding such as those described above.

For the purpose of producing different cables with two to five layers, the distributing plate 221 will be correspondingly constructed, as schematically shown in the Figs. 11 to 14. In these figures, the layer distributing plate 221 is shown schematically. In each case the opening 230 is that through which the strands pass in traveling through the pattern of the track. The solid part 224 of the plate 221 is shown shaded and the circles 250 represent the projecting latches of the chain 240 carrying the eyelets 241 for guiding the strands of the cable through the layer pattern.

It may be observed from a study of Figs. 11 to 14 that, in general, the track in the layer distributing plate guides the strands in an outer enveloping circle with a fold or folds projected towards the center in which the strands double back past each other in other essentially circular formations as shown. The folds projecting inward from the enveloping circle do not cross each other. If free movement were possible, they might be conceived of as being pulled outward and a single complete circle formed whose circumference would be the same as the total length of track. The movement in one complete cycle would then be one revolution. As the spool supply is rotated one revolution for each cycle of the distributor and in the same direction as the outer layer in the distributing patern, there would thus be no building up of a twist between the spool supply and the layer distributor. The folds projecting inward from the outer enveloping circle are compensating in direction and length so that any twisting action occurring during a portion of a cycle between any of the strands is undone by an equal reverse twist during a later portion of the cycle, leaving the only permanent twist, which is that occurring in the outer enveloping circle as aforementioned.

The general arrangement of the distributing plates shown in Figs. 11 to 14 may be viewed differently from the manner just stated, namely as involving a double track along both sides of openings in the plates. The double track guides the strands in opposite directions in double layers, so that any twisting between strands introduced in one side of a double layer will be untwisted in the other side. Since each strand passes through all positions in the plate while the spool supply makes one revolution, the building up of a twist between the spool supply and the layer distributor is avoided. With this point of view it may be readily seen that the spool supply should be rotated in the same direction as the outer side of a double layer, but that the plates may face in either direction relative to the spool supply.

The double layer may be formed in different manners to fill all positions in the cable with strands. Thus, in Fig. 11 the double layer is bent into a nearly closed circle F; in Fig. 12 it is bent into a partially overlapping spiral G; in Fig. 13 it is bent into two concentric circles H, I oppositely curved; and in Fig. 14 there are two paralleled branches J, K of the double layer from a stem portion L.

What is claimed is:

1. A method of stranding a cable having a plurality of strands arranged in a plurality of layers which comprises feeding said strands simultaneously and in a given order from a strand supply into a single layer distribution at a first distributing point, then feeding said strands in a spaced relation into a multilayer distribution at a second distributing point, and then feeding said strands with said layer distribution into a compacted cable, said strands being moved lengthwise at a substantially uniform speed through said first and second points, and said strands at said second point being moved transversely to all travel through similar portions of any one of said layers in said layer distribution and in their said order.

2. A method of stranding a cable in accordance with claim 1 in which said compacted cable is subsequently twisted bodily about its axis at a uniform angular speed relative to said speed of lengthwise movement.

3. A method of stranding a cable having a plurality of strands arranged in a plurality of layers which comprises feeding said strands simultaneously and in a given order from a strand supply into a single layer distribution at a first distributing point, then feeding said strands in a spaced relation into a multilayer distribution at a second distributing point, and then feeding said strands with said layer distribution into a compacted cable, said layer distribution having a plurality of layers corresponding to the plurality of layers in the cable, said strands being moved lengthwise at a substantially uniform speed through said first and second points, and said strands being moved transversely at a substantially uniform speed and in their said order to each successively occupy the simultaneous positions of all others of said strands in the plurality of layers in said layer distribution.

4. A method of stranding a cable having a plurality of strands arranged in a plurality of concentric layers which comprises feeding said strands simultaneously and in a given order from a strand supply into a substantially circular distribution at a first distributing point, then feeding said strands in a spaced relation into a layer distribution at a second distributing point, and then feeding said strands with said layer distribution into a compacted cable, said layer distribution having a plurality of concentric layers corresponding to the plurality of concentric layers in the cable, said strands being moved lengthwise at a substantially uniform speed through said first and second points, and said strands at said second point being moved transversely at a substantially uniform speed and in their said order to each travel in a cyclic path including at least a portion of each of said layers in said cable.

5. A method of stranding a cable having a plurality of strands arranged in a plurality of concentric layers which comprises feeding said strands simultaneously and in a given order from a strand supply into a substantially circular distribution at a first distributing point, then feeding said strands in a spaced relation into a layer distribution at a second distributing point, and then feeding said strands with said layer distribution into a compacted cable, said layer distribution having a plurality of concentric layers corresponding to the plurality of concentric layers in the cable, said strands being moved lengthwise at a substantially uniform speed through said first and second points, and said strands at said second point being moved transversely at a substantially uniform speed and in their said order to each travel in a cyclic path including at least a portion of each of said layers in said layer distribution, said paths for all of said strands having the same configuration.

6. A method of stranding a cable having a plurality of strands arranged in a desired plurality of concentric layers which comprises feeding said strands simultaneously and in a given order from a strand supply into a substantially circular distribution at a first distributing point, then feeding said strands in a spaced relation into a layer distribution at a second distributing point, then feeding said strands with said layer distribution into a compacted cable at a compacting point and then revolving said compacted cable bodily about its axis to impart an overall stranding lay thereto, said layer distribution having a plurality of concentric layers corresponding to said desired plurality of concentric layers, said strands being moved lengthwise at a substantially uniform average speed through said three points and said strands at said second point being moved transversely relative to a surface reference line at a substantially uniform speed along a layer pattern and in their said order, so that all strands will occupy similar paths in the compacted and stranded cable, each path extending through all possible strand positions in each of said layers.

7. A method of stranding a cable having a plurality of strands arranged in a plurality of concentric layers which comprises feeding said strands simultaneously and in a given order from a strand supply into a substantially circular distribution at a first distributing point, then feeding said strands in a spaced relation into a layer distribution at a second distributing point, and then feeding said strands with said layer distribution into a compacted cable, said layer distribution having a plurality of concentric layers corresponding to the plurality of concentric layers in the cable, said strands being moved lengthwise at a substantially uniform speed through said first and second points, said strands at said second point being moved transversely at a substantially uniform speed and in their said order to each travel in a cyclic path including at least a portion of each of said layers in said cable, said paths for all of said strands having the same configuration and each strand on completion of each cyclic movement returning to its individual position relative to said circular distribution from which it started the cyclic movement.

8. A method of stranding a cable having a plurality of strands arranged in a plurality of concentric layers which comprises feeding the strands simultaneously and in a given order from a strand supply into a substantially circular distribution at a first distributing point, then feeding said strands in a spaced relation into a layer distribution having a plurality of layers at a second distributing point, and then feeding said strands with the said layer distribution into a compacted cable, said strands at said second point being moved transversely in their said order to each occupy all possible positions successively in the plurality of layers in said layer distribution, said strands simultaneously therewith being moved longitudinally through a predetermined distance and the transverse movement of all of said strands into said possible positions being repeated during successive lengthwise movements of the strands.

9. A cable stranding machine comprising a strand supply including a plurality of individual strand spools, cable compacting means for gathering all the strands from said supply into a cable of substantially circular cross-section, power driven means for pulling all the strands at a uniform average speed lengthwise through said machine, a plurality of strand distributing plates arranged in succession between said strand supply and said compacting means, each of said plates having strand guiding means for each strand, and driving means for moving all the strands in all said guiding means in each of said plates transversely of the strands at uniform speed, in a predetermined order and along fixed paths common to all the strands in the cable and different in the different plates for gradual distribution of all the strands from said strand supply into a desired layer distribution having a plurality of concentric layers, said layer distribution of all the strands being continuously fixed in said compacting means for inclusion in the cable.

10. A cable stranding machine comprising a strand supply including a plurality of individual strand spools, a circular distributor for all the strands of the cable from said spools, a layer distributor for guiding all of the strands into a single concentric layer formation, a cable compacting die for gathering the strands with their layer formation into a cable of substantially circular cross-section, means for pulling the strands at a uniform speed through said machine, each of said distributors having strand guiding means for each strand, and driving means for moving said guiding means in said layer distributor transversely of the axis of the machine and at substantial uniform speed.

11. A cable stranding machine comprising a strand supply including a plurality of individual strand spools, a circular distributing plate for all the strands in the cable from said spools, a layer distributing plate for guiding all of the strands into a desired layer formation, a cable compacting die for gathering the strands with their layer formation into a cable of substantially circular cross-section, a drum for pulling the strands at a uniform speed through said machine, each of said distributing plates having strand guiding means for each strand, driving means for moving said strands in said guiding means in said layer distributing plate transversely of the axis of the machine and at substantially uniform speed, a track for said transverse travel of said guiding means and strands configured to guide the travel of said guiding means and strands through a cyclic path of concentric layers substantially conforming to a desired single concentric layer disposition of all the strands in the cable.

12. A cable stranding machine comprising a revolving spool cage including a plurality of individual strand spools for all the strands of the cable, a cable storing cradle including a cable drum motor-driven for pulling the strands lengthwise at uniform speed, a layer distributor disposed between said spool cage and said storing cradle for guiding all of the strands of the cable into a desired layer formation in a cable of substantially circular cross-section and including a stationary track configured in accordance with said layer formation and traveling guide means for all the strands, said guide means being driven to move each of the strands transversely over the whole track once for each revolution of said spool cage.

13. A cable stranding machine comprising a strand supply including a plurality of individual strand spools, a circular distributor for all the strands from said spools, a layer distributor for guiding all of the strands into a desired layer formation, a cable compacting die for gathering the strands with their layer formation into a cable, means for pulling the strands at a uniform speed through said machine, each of said distributors having strand guiding means for each strand, and driving means for moving said guiding means in said layer distributor transversely of the axis of the machine and at substantially uniform speed, said machine further comprising strand separating means disposed between said circular distributor and said layer distributor to prevent said strands from engaging each other as they are variously bent from their circular distribution to their layer distribution.

14. A cable stranding machine comprising a strand supply including a plurality of individual strand spools, a circular distributor for all the strands from said spools, a layer distributor for guiding all of the strands into a desired layer formation, a cable compacting die for gathering the strands with their layer formation into a cable, means for pulling the strands at a uniform speed through said machine, each of said distributors having strand guiding means for each strand, and driving means for moving said guiding means in said layer distributor transversely of the axis of the machine and at substantially uniform speed, said machine further comprising strand separating means individual to each of said strands and disposed between said circular distributor and said layer distributor to prevent said strands from engaging each other as they are variously bent from their circular distribution to their layer distribution.

15. A cable stranding machine in accordance with claim 12 further comprising a plurality of flexible separating tubes, each tube being disposed about one of said strands to partake in the transverse movements thereof between said spool cage and said layer distributing plate to prevent direct engagement between said strands.

16. In a stranding machine for combining strands to form a composite structure having a plurality of annular layers, means for guiding each strand in a manner to proceed at regular intervals from an inside layer through an intermediate layer to an outside layer of strands of the composite structure, said means comprising a carrier for carrying all the strands of the cable in a single path appropriate to successively place each strand in all said layers, said path having portions corresponding to each layer and of a length proportionate to the relative number of strands in that layer as compared to the other layers.

17. A multiple-layer cable stranding machine comprising a spool cradle, including a plurality of strand spools mounted in fixed mutual relation, a cable compacting die for gathering the strands from said spools into a cable, and strand distributing means intermediate said cradle and said die for periodically moving the strands transversely and radially for successive guidance of each strand into the different layers of the multiple-layer cable as the strands pass through said machine.

18. A stranding machine for making a multiple-layer cable, said machine comprising a strand supply including a plurality of individual strand spools and a spool cradle for mounting of said spools and for rotation of said spools about the axis of said machine in fixed mutual relation, said machine further comprising a cable compacting die for gathering the strands from said spools into a multiple-layer cable, and strand distributing means intermediate said cradle and said die including a stationary guide frame having a track configured to represent the layers in said cable and traveling conveyor means adapted to travel along said track in a cycle equal to the cycle of rotation of said cradle, said conveyor means including guide means adapted for guiding the strands transversely and radially into the different layers of said cable in conformity with said configuration as the strands pass through said machine.

19. A cable stranding machine comprising a strand supply including a plurality of strand supply spools for all the strands in a cable mounted in fixed mutual relation, cable compacting means for gathering all the strands into a cable, means for pulling the strands with uniform speed from said spools, and a layer distributor disposed between said strand supply and said compacting means for in cooperation with said compacting means guiding all the strands into a plurality of concentric annular layers in the cable, said distributor including a continuous guide track with a plurality of essentially concentric portions each corresponding to one of the said annular layers, individual strand guide means for the passing portions of all of said strands and driving means for continuously moving each of said strand guide means and strands transversely over the entire track.

20. A cable stranding machine comprising a strand supply including strand supply spools for all the strands in a plurality of annular layers of a cable mounted in fixed mutual relation, cable compacting means for gathering the strands into the cable, means for pulling the strands with uniform speed from said spools, and a layer distributor disposed between said strand supply and said compacting means for in cooperation with said compacting means guiding the strands into said plurality of annular layers in the cable, said distributor including a continuous track, guide means for all of said strands and driving means for continuously moving each of said guide means and strands transversely over the entire track.

21. A cable stranding machine comprising a revolving spool cage including strand supply spools for all the strands in a plurality of annular layers of a cable, said spools being mounted in fixed mutual relation, a cable compacting die for gathering the strands into the cable, means for pulling the strands with uniform speed from said spools, and a layer distributor disposed between said cage and said die for in cooperation with said die guiding the strands into said plurality of annular layers in the cable, said distributor including a continuous stationary track, traveling guide means for all of said strands and driving means for moving said strands through said guide means transversely over the entire track once for each revolution of said spool cage.

22. In a cable stranding machine a revolving spool cage with supply spools mounted in fixed mutual relation, a layer distributing plate for guiding a plurality of strands from said spools into a cable of circular cross-section with a layer formation including a plurality of annular double layers with opposite direction of stranding in the layers of each double layer, said plate comprising a double track configured to represent effectively the said plurality of double layers, power driven endless conveyor means disposed along both sides of said double track for continuous travel along the entire length of said track and including individual strand guide means for transverse movement of said strands in opposite directions along said double track, and driving means for imparting lengthwise movement of said strands through said guide means at a predetermined rate relative to said transverse movement of said strands.

ROBERT P. ASHBAUGH.
ARTHUR G. HALL.